United States Patent
Liu et al.

(10) Patent No.: US 10,217,018 B2
(45) Date of Patent: Feb. 26, 2019

(54) SYSTEM AND METHOD FOR PROCESSING IMAGES USING ONLINE TENSOR ROBUST PRINCIPAL COMPONENT ANALYSIS

(71) Applicant: Mitsubishi Electric Research Laboratories, Inc., Cambridge, MA (US)

(72) Inventors: Dehong Liu, Lexington, MA (US); Zemin Zhang, Malden, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 94 days.

(21) Appl. No.: 14/854,634

(22) Filed: Sep. 15, 2015

(65) Prior Publication Data

US 2017/0076180 A1    Mar. 16, 2017

(51) Int. Cl.
G06K 9/00    (2006.01)
G06K 9/40    (2006.01)
G06K 9/62    (2006.01)

(52) U.S. Cl.
CPC .......... *G06K 9/40* (2013.01); *G06K 9/0063* (2013.01); *G06K 9/6247* (2013.01)

(58) Field of Classification Search
CPC ....... G06K 9/40; G06K 9/0063; G06K 9/6247
See application file for complete search history.

(56) References Cited

U.S. PATENT DOCUMENTS

| | | | | |
|---|---|---|---|---|
| 2006/0165308 A1* | 7/2006 | Chakraborty | ........... | G06T 5/002 382/254 |
| 2008/0247608 A1* | 10/2008 | Vasilescu | ........... | G06K 9/00275 382/118 |
| 2014/0181171 A1* | 6/2014 | Dourbal | ................. | G06F 17/16 708/607 |
| 2015/0074158 A1* | 3/2015 | Kimmel | ............ | G06K 9/00214 708/270 |
| 2015/0301208 A1* | 10/2015 | Lewis | .................... | G01V 1/282 702/14 |
| 2016/0013773 A1* | 1/2016 | Dourbal | ................. | G06F 17/16 708/209 |

(Continued)

OTHER PUBLICATIONS

Lu et al., "Tensor Robust Principal Component Analysis: Exact Recovery of Corrupted Low-Rank Tensors via Convex Optimization", IEEE, 2016.*

(Continued)

*Primary Examiner* — Aaron W Carter
(74) *Attorney, Agent, or Firm* — Gene Vinokur; James McAleenan; Hironori Tsukamoto (57) ABSTRACT

A set of input images are acquired sequentially as image tensors. A low-tubal rank tensor and a sparse tensor are initialized using the image tensor, wherein the low-tubal rank tensor is a tensor product of a low-rank spanning tensor basis and corresponding tensor coefficients, and for each image, updating iteratively the image tensor, the tensor coefficients, and the sparse tensor using the image tensor and the low-rank spanning basis from a previous iteration. The spanning tensor basis is updated using the tensor coefficients, the sparse tensor, and the low rank tubal tensor, wherein the low rank tubal tensor represents a set of output images and the sparse tensor representing a set of sparse images.

20 Claims, 9 Drawing Sheets

(56) References Cited

U.S. PATENT DOCUMENTS

2016/0232175 A1* 8/2016 Zhou .................... G06T 1/20
2016/0299243 A1* 10/2016 Jin ...................... G01V 1/38
2017/0076180 A1* 3/2017 Liu ..................... G06K 9/40

OTHER PUBLICATIONS

Qiu et al., "Recursive Projected Sparse Matrix Recovery (REPROSMR) With Application in Real-Time Video Layer Separation", IEEE, 2014.*

Jiashi Feng, Huan Xu, and Shuicheng Yan, "Online robust PCA via stochastic optimization," in Advances in Neural Information Processing Systems 26, pp. 404-412. Curran Associates, Inc., 2013.

Zemin Zhang, Gregory Ely, Shuchin Aeron, Ning Hao, and Misha Elena Kilmer, "Novel methods for multilinear data completion and de-noising based on tensor-SVD," in IEEE Conference on Computer Vision and Pattern Recognition, 2014, pp. 3842-3849.

Misha E. Kilmer and Carla D. Martin, "Factorization strategies for third-order tensors," Linear Algebra and its Applications, vol. 435, No. 3, pp. 641-658, Aug. 2011.

Carmeliza Navasca, Michael Opperman, Timothy Penderghest, and Christino Taman, "Tensors as module homomorphisms over group rings," CoRR, vol. abs/1005.1894, 2010.

Kilmer et al. "Third-Order Tensors as Operators on Matrices: A Theoretical and Computational Framework with Applications in Imaging," SIAM. J. Matrix Anal. & Appl., vol. 34, Issue 1, 148-172. Feb. 28, 2013.

\* cited by examiner

Algorithm 1 Online Tensor Robust PCA

Input: Sequentially observed data $\mathcal{Z}_T = \{\vec{\mathcal{Z}}_1, \ldots, \vec{\mathcal{Z}}_T\} \in \mathbb{R}^{n_1 \times 1 \times n_3}$, $\lambda_1, \lambda_2 > 0$, number of rounds $T$.

Initial: $\mathcal{L}_0 \in \mathbb{R}^{n_1 \times r \times n_3}$, $\mathcal{R}_0 \in \mathbb{R}^{r \times 1 \times n_3}$, $\mathcal{E}_0 \in \mathbb{R}^{n_1 \times 1 \times n_3}$.

1: for $t = 1, 2, \ldots, T$ do
2:      Reveal data sample $\vec{\mathcal{Z}}_t$.
3:      Project the new sample(See Algorithm 2):

$$(\vec{\mathcal{R}}_t, \vec{\mathcal{E}}_t) = \underset{\substack{\vec{\mathcal{R}} \in \mathbb{R}^{r \times 1 \times n_3} \\ \vec{\mathcal{E}} \in \mathbb{R}^{n_1 \times 1 \times n_3}}}{\operatorname{argmin}} \frac{1}{2} \| \vec{\mathcal{Z}}_t - \mathcal{L}_{t-1} * \vec{\mathcal{R}} - \vec{\mathcal{E}} \|_F^2 + \frac{\lambda_1}{2} \| \vec{\mathcal{R}} \|_F^2 + \lambda_2 \| \vec{\mathcal{E}} \|_1$$

4:      $\mathcal{A}_t = \mathcal{A}_{t-1} + \vec{\mathcal{R}}_t * \vec{\mathcal{R}}_t^T$, $\mathcal{B}_t = \mathcal{B}_{t-1} + (\vec{\mathcal{Z}}_t - \vec{\mathcal{E}}_t) * \vec{\mathcal{R}}_t^T$. Then write $\mathcal{A}_t, \mathcal{B}_t$ into block diagonal form $\bar{\mathcal{A}}_t, \bar{\mathcal{B}}_t$.
5:      Compute $\mathcal{L}_t$ using $\mathcal{L}_{t-1}$ as the starting point(See Algorithm 3):

$$\bar{\mathcal{L}}_t \triangleq \underset{\bar{\mathcal{L}}}{\operatorname{argmin}} \frac{1}{2} \operatorname{tr}[\bar{\mathcal{L}}^T (\bar{\mathcal{A}}_t + n_3 \lambda_1 I) \bar{\mathcal{L}}] - \operatorname{tr}(\bar{\mathcal{L}}^T \bar{\mathcal{B}}_t).$$

6:      Organize the block diagonal $\bar{\mathcal{L}}_t$ into the tensor form $\mathcal{L}_t$ and let $\mathcal{L}_t = \mathrm{ifft}(\bar{\mathcal{L}}_t, [\,], 3)$.
7: end for
8: $\mathcal{R}_T(:, t, :) = \vec{\mathcal{R}}_t^T$, $\mathcal{E}_T(:, t, :) = \vec{\mathcal{E}}_t$, $t = 1, 2, \ldots, T$.
9: Return $\mathcal{X}_T = \mathcal{L}_T * \mathcal{R}_T^T$, $\mathcal{E}_T$.

Output: Low tubal rank tensor $\mathcal{X}_T$ and sparse tensor $\mathcal{E}_T$.

FIG. 6

Algorithm 2 Projecting data samples

Input: $\mathcal{L}_{t-1} \in \mathbb{R}^{n_1 \times r \times n_3}, \vec{\mathcal{Z}}_t \in \mathbb{R}^{n_1 \times 1 \times n_3}, \lambda_1, \lambda_2 > 0.$
Initial: $\vec{\mathcal{E}}_t = 0, \hat{\vec{r}}_t \in \mathbb{C}^{r \times 1 \times n_3}.$
1: $\hat{\vec{z}}_t = \text{fft}(\vec{\mathcal{Z}}_t, [\,], 3), \hat{\mathcal{L}}_{t-1} = \text{fft}(\mathcal{L}_{t-1}, [\,], 3).$
2: while not converge do
3:   for $i = 1, 2, \ldots, n_3$ do
4:     $\hat{r}_t^{(i)} = ((\hat{\mathcal{L}}_{t-1}^{(i)})^{\mathrm{T}} \hat{\mathcal{L}}_{t-1}^{(i)} + \lambda_1 I)^{-1} (\hat{\mathcal{L}}_{t-1}^{(i)})^{\mathrm{T}} (\hat{z}_t^{(i)} - \hat{e}_t^{(i)}).$
5:   end for
6:   $\vec{\mathcal{R}}_t = \text{ifft}(\hat{\vec{r}}_t, [\,], 3).$
7:   $\vec{\mathcal{E}}_t = S_{\lambda_2}[\vec{\mathcal{Z}}_t - \mathcal{L}_{t-1}^{\mathrm{T}} * \vec{\mathcal{R}}_t].$
8: end while
Output: $\vec{\mathcal{R}}_t$ and $\vec{\mathcal{E}}_t.$

FIG. 7

Algorithm 3 Update spanning tensor basis

Input: $\mathcal{L}_{t-1} \in \mathbb{R}^{n_1 \times n_2 \times n_3}, \mathcal{A}_t \in \mathbb{R}^{r \times n_3}, \mathcal{B}_t \in \mathbb{R}^{n_1 \times r \times n_3}$
Output: $\mathcal{L}_t$.

1: $\mathcal{L}_t = \mathcal{L}_{t-1}, \widehat{\mathcal{L}}_t = \text{fft}(\mathcal{L}_t, [\,], 3)$.
2: $\widehat{\mathcal{B}}_t = \text{fft}(\mathcal{B}_t, [\,], 3)$.
3: $e_t = \mathcal{A}_t + \lambda_1 \vartheta, \widehat{e}_t = \text{fft}(e_t, [\,], 3)$.
4: for $j = 1, 2, \ldots, r$ do
5:   for $k = 1, 2, \ldots, n_3$ do
6:     $\widehat{\mathcal{L}}_t(:, j, k) = \frac{\widehat{\mathcal{B}}_t(:,j,k) - \widehat{\mathcal{L}}_t(:,j,k) * \widehat{e}_t(:,j,k)}{\widehat{e}_t(j,j,k)} + \widehat{\mathcal{L}}_t(:, j, k)$.
7:   end for
8: end for
9: $\mathcal{L}_t = \text{ifft}(\widehat{\mathcal{L}}_t, [\,], 3)$.

SYSTEM AND METHOD FOR PROCESSING IMAGES USING ONLINE TENSOR ROBUST PRINCIPAL COMPONENT ANALYSIS

FIELD OF THE INVENTION

This invention relates generally to computer vision, and more particularly to processing a sequence of images online.

BACKGROUND OF THE INVENTION

In many computer vision applications, images can be processed to detect objects, or to improve the quality of the input images by, e.g., background subtraction, removing or reducing unwanted artifacts, noise and occlusions. In image processing, principal component analysis (PCA) is commonly applied for dimensionality reduction. However, when the image data contains unintended artifacts, such as gross corruptions, occlusions or outliers, the conventional PCA can fail. To solve this problem, robust PCA (RPCA) models can be used.

An online recursive RPCA can separate data samples in an online mode, i.e., with only a previous estimate and newly acquired data. Unlike the conventional RPCA methods, which first saves all the data samples and then processes them, the online RPCA significantly reduces the required memory requirement and improves computational efficiency and convergence.

For multidimensional data (tensors) of order greater than 2, it is common to embed the data into a vector space by vectorizing the data such that conventional matrix-based approaches can still be used. Although this vectorization process works well in most cases, it restricts the effectiveness of the tensor representation in extracting information from the multidimensional perspective.

Alternatively, tensor algebraic approaches exhibit significant advantages in preserving multidimensional information when dealing with high order data. However, it is very time-consuming for the tensor RPCA to operate in batch mode because all of the high dimensional data needs to be stored and processed.

SUMMARY OF THE INVENTION

Tensor robust principal component analysis (PCA) is used in many image processing applications such as background subtraction, denoising, and outlier and object detection, etc. The embodiments of the invention provide an online tensor robust PCA where multi-dimensional data, representing a set of images in the form of tensors are processed sequentially. The tensor PCA updates tensors based on the previous estimation and newly acquired data.

Compared to the conventional tensor robust PCA operating in batch mode, the invention significantly reduces the required amount of memory and improves computational efficiency. In addition, the method is superior in convergence speed and performance compared to conventional batch mode approaches. For example, the performance is at least 10% better than for matrix-based online robust PCA methods according to a relative squared error, and the speed of convergence is at least three times faster than for the matrix-based online robust PCA methods.

To reduce memory and increase computational efficiency, we provide an online tensor RPCA algorithm, which extends an online matrix PCA method to high dimensional data (tensor). The online tensor RPCA is based in part on a tensor singular value decomposition (t-SVD) structure.

The key idea behind this tensor algebraic is to construct group-rings along tensor tubes subsequently. For example, regard a 2-D array as a vector of tubes and 3-D tensor as a matrix of tubes; such a tensor framework has been used in high dimensional data compression and completion. The embodiments extend the batch tensor RPCA problem and provide the benefit of sequential data collection, which reduces the required memory and increases efficiency.

BRIEF DESCRIPTION OF THE DRAWINGS

FIG. 6 is a block diagram of pseudocode for the online tensor robust PCA according to embodiments of the invention;

DETAILED DESCRIPTION OF THE PREFERRED EMBODIMENTS

Figure 1:
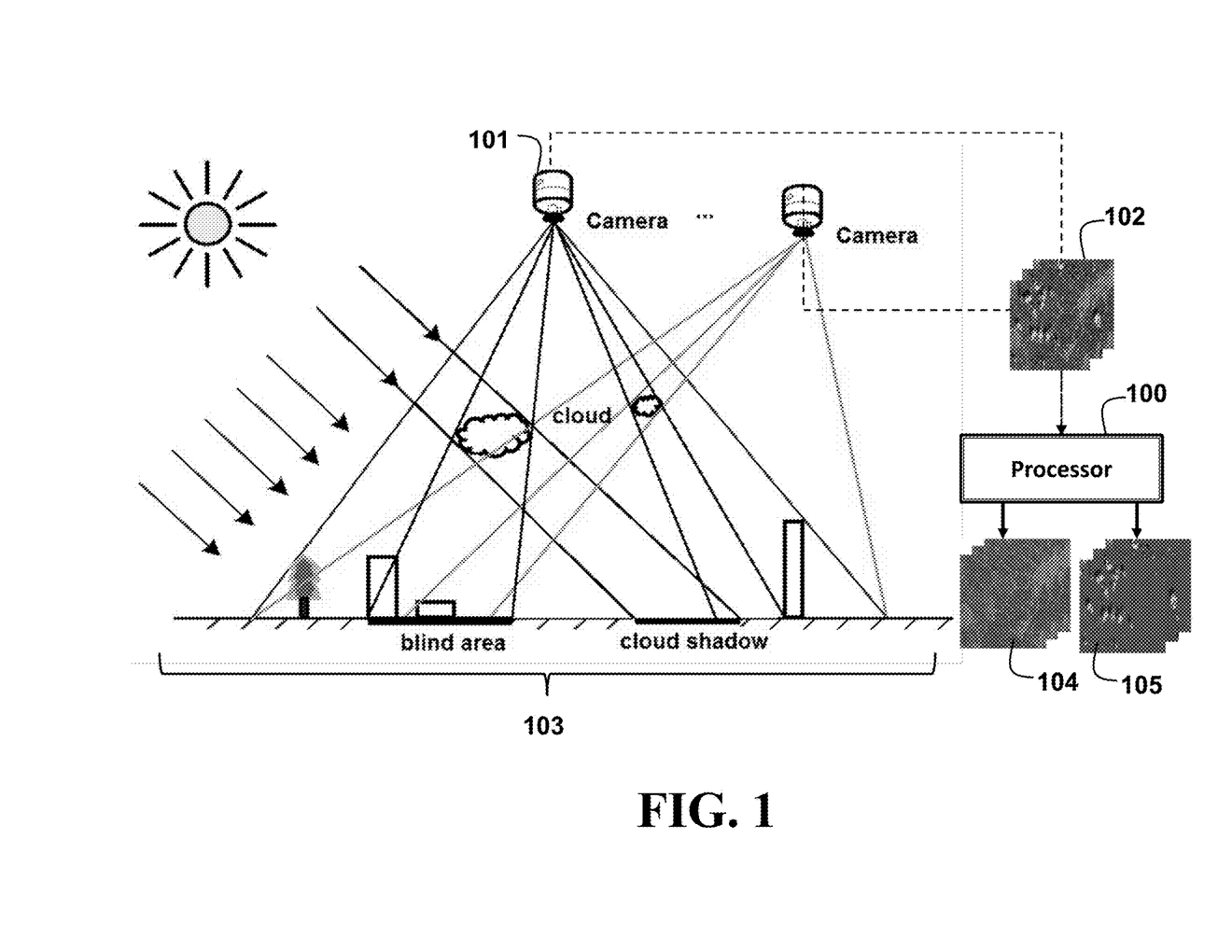
FIG. 1 is a schematic of a system for enhancing images according to embodiments of the invention.

FIG. 1 is a schematic of a system for processing images according to embodiments of our invention. A sensor 101, e.g., a camera in a satellite, sequentially captures a set of T input images 102 of a scene 103. The images can be obtained by a single moving sensor at time steps t. Sequential acquisition reduces memory requirements to store the images, because the images are processed online as they are acquired by the sensor and received by a processor. The images can overlap to facilitate registering the images with each other. The images can be gray scale images or color images. In addition, the images can be multi-temporal images or multi-angle view images acquired sequentially.

In the example application shown in FIG. 1, the sensor is arranged in a moving space or airborne platform (satellite, airplane or drone), and the scene 103 is ground terrain. The scene can include occlusions due to structures in the scene, such as buildings, and clouds between the scene and sensors. The goal is to produce a set of enhanced output images 104, without occlusions. As a by-product, the system also produces a set of sparse images 105 including just the occlusions, e.g., the clouds.

Figure 2:
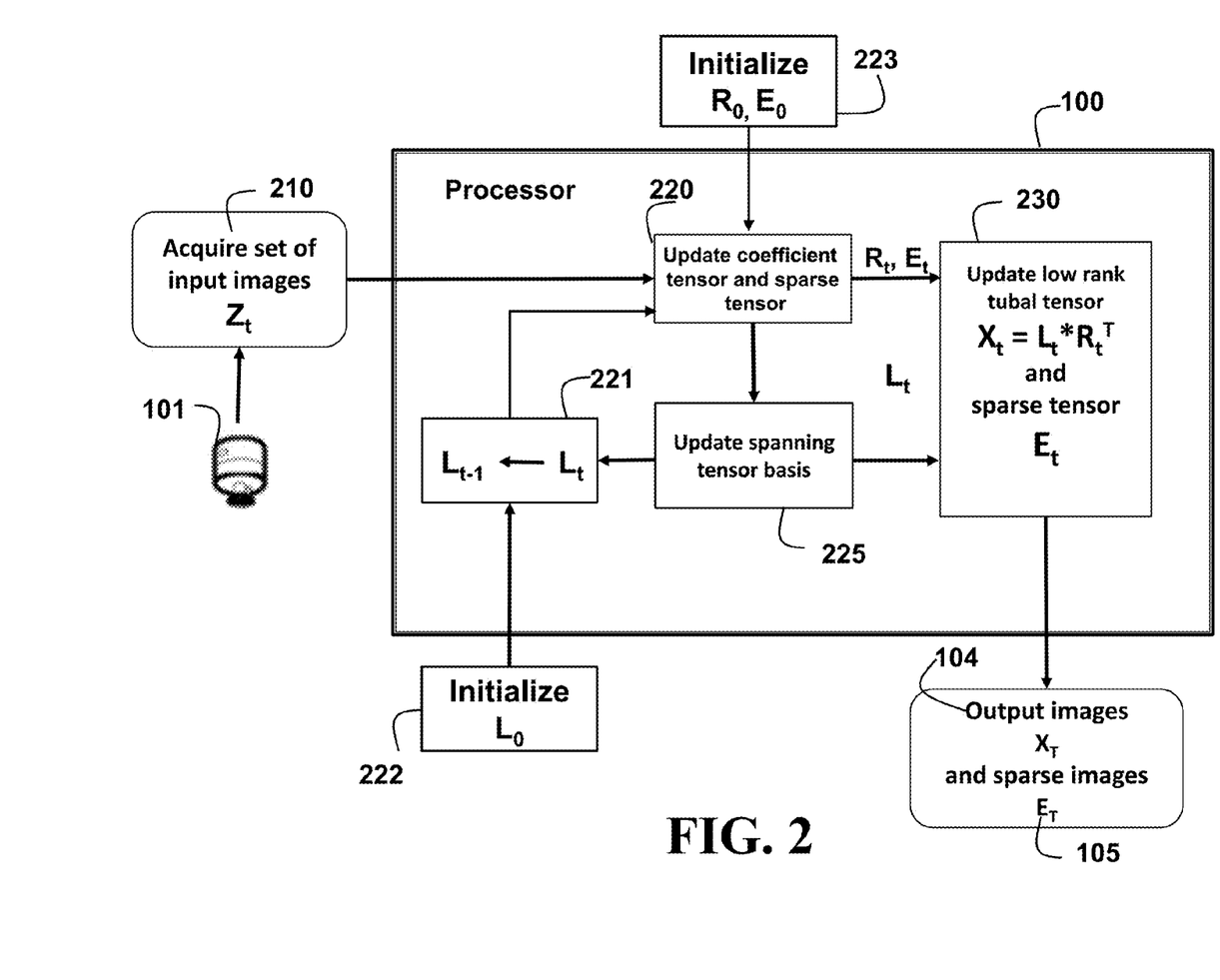
FIG. 2 is a flow diagram of a method for enhancing images according to embodiments of the invention.

As shown in FIG. 2, the method operates in a processor 100, which can be connected to the sensor 101, either electrically or wirelessly. Prior to processing the images, a spanning tensor is initialized 222 as $L_0$, and tensor coefficients $R_0$ and a sparse tensor $E_0$ are initialized 223, see FIG. 6 described below.

The set of input images 101 are acquired 210 by the processor either directly or indirectly, e.g., the image can be acquired 106 by a camera, a video camera, or be obtained by other means or from other sources, e.g., a memory transfer, or wireless or wireless communication. For the purpose of the processing described herein, each image is represented by the image tensor $Z_t$.

For each image at time step t, the following steps are performed. Data samples in the image are projected 220 to the tensor coefficients $R_t$ and the sparse tensor $E_t$ using a previous spanning tensor basis $L_{t-1}$, where $R_t(t, :, :) = \vec{R}$ denotes the coefficients corresponding the spanning basis $L_{t-1}$, and $E_t(:, t, :) = \vec{E}$, t=1,2, ..., T.

The spanning tensor basis is updated 225 by using the previous basis $L_{t-1}$ as the starting point. The updated spanning tensor basis $L_t$ is saved for the next image to be processed. A low rank tubal tensor $X=L_t*R_t^T$ and the sparse tensor $E_t$ are updated 230 to produce a set of output images $X_t$ 104 and a set of sparse images $E_t$ 105, so that $X_t + E_t = Z_t$.

Overview of Tensor Framework

We describe the tensor structure used by the embodiments of the invention, taking third-order tensor as an example. Instead of vectorizing images of size $n_1 \times n_3$ into a vector of dimension $n_1 n_3$ as in conventional image processing, we consider each image as a vector of tubal scalars normal to the image plane. All the vectors form a free module over a commutative ring with identity, and the free module behaves similarly to vector spaces with basis and dimension, which are well-defined.

Notations and Definitions

For a third-order tensor A of size $n_1 \times n_2 \times n_3$, A(i, j, k) denotes the (i, j, k)$^{th}$ element of A and A(i, j, :) denotes the (i, j)$^{th}$ tubal-scalar. A(i, :, :) is the i$^{th}$ horizontal slice, A(:, j, :) is the j$^{th}$ lateral slice, and A(:, :, k) or $A^{(k)}$ denotes the k$^{th}$ frontal slice of A respectively.

t-Product

Figure 3:
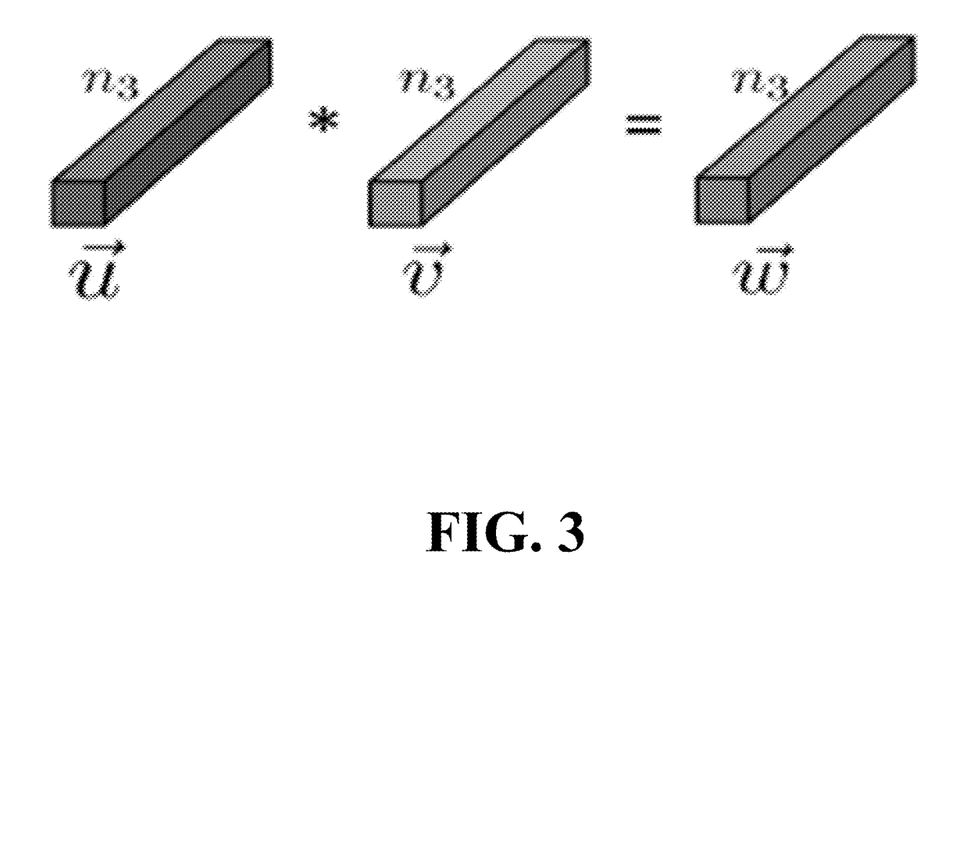
FIG. 3, is a schematic of a multiplication operation (t-product) used by embodiments of the invention.

Let $\vec{v} \in \mathbb{R}^{1 \times 1 \times n_3}$ be a $n_3$-tuple, perpendicular to the image plane. As shown in FIG. 3, a multiplication operation (t-product) between two $n_3$-tuples $\vec{u}$ and $\vec{v}$ via circular convolution results in another $n_3$-tuple $\vec{w}$ represented by $$\vec{w}(i) = \vec{u} * \vec{v} = \Sigma_{k=0}^{n_3-1} \vec{u}(k) \vec{v}((i-k) \mod(n_3)), \quad (1)$$

where i=0, 1, ..., $n_3$−1.

Given two third-order tensors $A \in \mathbb{R}^{n_1 \times n_2 \times n_3}$ and $B \in \mathbb{R}^{n_2 \times n_4 \times n_3}$, the result of the t-product of A and B is a third-order tensor C of size $n_1 \times n_4 \times n_3$ defined as $$C(i, l, :) = A*B = \Sigma_{j=1}^{n_2} A(i, j, :) * B(j, l, :), \quad (2)$$

where i=1, 2, ..., $n_1$ and l=1, 2, ..., $n_4$. This is consistent with the multiplication between matrices with the t-product '*' corresponding to the multiplication operation.

Commutative Ring

Under the defined multiplication (t-product) and the addition, the set of $n_3$-tuples forms a commutative ring $\mathbb{R}(\mathbb{G}_{n_3})$ with an identity $\vec{e} = [1, 0, 0, \ldots, 0]$.

Free-Module over the Commutative Ring

Let $\mathbb{M}_{n_3}^{n_1}$ be a set of all 2-D lateral slices of size $n_1 \times 1 \times n_3$. Every element in $\mathbb{M}_{n_3}^{n_1}$ can be characterized as a vector of tubal-scalars. Because for any element $X \in \mathbb{M}_{n_3}^{n_1}$ and coefficient $v \in \mathbb{R}(\mathbb{G}_{n_3})$, $Y=X*v$ is also an element of $\mathbb{M}_{n_3}^{n_1}$, $\mathbb{M}_{n_3}^{n_1}$ is closed under the tubal-scalar multiplication.

Moreover, $\mathbb{M}_{n_3}^{n_1}$ is a free module of dimension $n_3$ over the commutative ring $\mathbb{R}(\mathbb{G}_{n_3})$. We can construct a spanning basis $\{B_1, B_2, \ldots, B_{n_3}\}$ for this module using the relation between Fourier transform and circular convolution.

Figure 4:
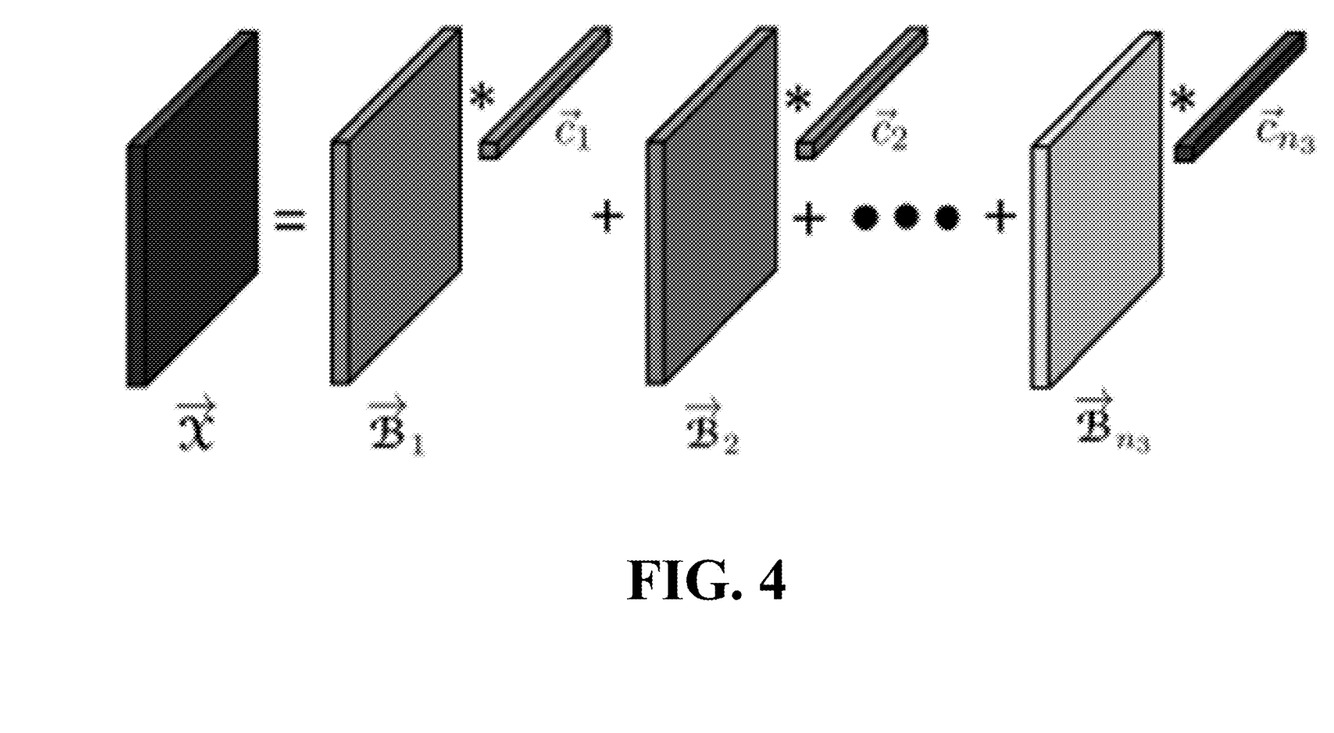
FIG. 4 is a schematic of an element of a free module generated by t-linear combination of a spanning basis and coefficients.

FIG. 4 shows, given the spanning basis, that any element $X \in \mathbb{M}_{n_3}^{n_1}$ can be uniquely represented as a t-linear combination with tubal-scalar coefficients $\vec{c}$.

$$\vec{X} = \Sigma_{i=1}^{n_3} \vec{B} * \vec{c}_i, \quad (3)$$

Tensor-PCA and Tensor Singular Value Decomposition (t-SVD)

Similar to the matrix PCA that identifies the lower-dimensional subspace approximately containing the data, we consider a tensor PCA for high-order tensor data. We focus on third-order tensors. Suppose the 2-D data samples come from a lower dimensional free submodule of the free module $\mathbb{M}_{n_3}^{n_1}$, where a free submodule is a subset of $\mathbb{M}_{n_3}^{n_1}$ with a spanning basis of dimension d<n. Our goal is to identify the free submodule containing the 2-D data samples.

t-SVD

Given $n_2$ 2-D data samples $X_1, \ldots, X_{n_2}$ of size $n_1 \times n_3$, we arrange the samples as lateral slices to make a 3-D tensor X of size $n_1 \times n_2 \times n_3$. Then, the t-SVD method is used to determine the spanning basis (principal components) of the submodule.

Figure 5:
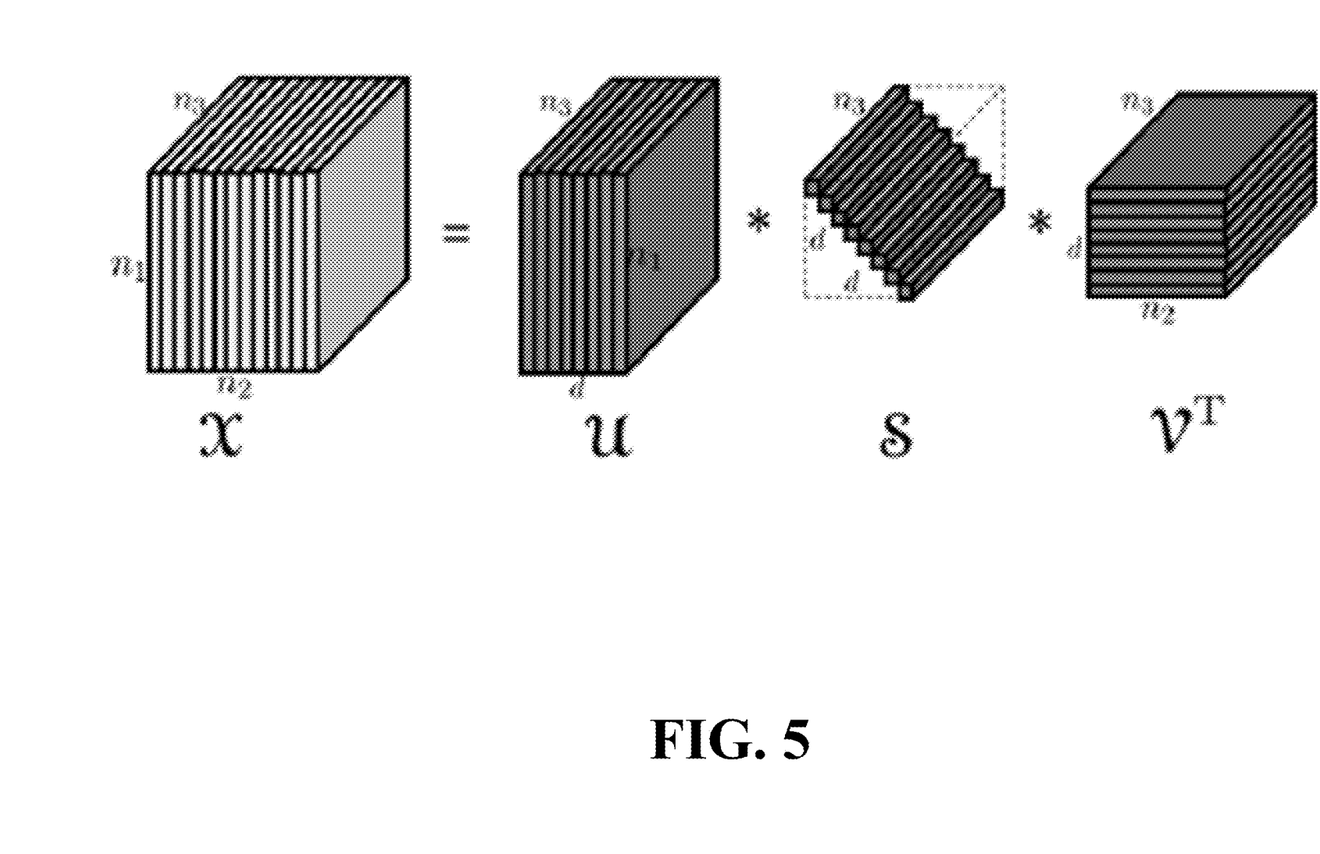
FIG. 5 is a schematic of a t-SVD $X=U*S*V^T$ used by embodiments of the invention.

As shown in FIG. 5, t-SVD is defined as $$X = U * S * V^T, \quad (4)$$

where $U \in \mathbb{R}^{n_1 \times d \times n_3}$ and $V \in \mathbb{R}^{n_2 \times d \times n_3}$ are called orthogonal tensors which satisfy $U*U^T=I$ and $V*V^T=I$, where I is the identity tensor whose frontal slices are all zeros except the first one an identity matrix, and superscript T is the transpose operator.

$S \in \mathbb{R}^{d \times d \times n_3}$ is a tensor whose frontal slices are diagonal matrices. The tubal scalars S(i, i, :), i=1, 2, ..., d on the image plane are called singular tubes, where d is the rank of the tubal scalars.

Based on the relation between the circular convolution and the discrete Fourier transform (DFT), we can determine the t-SVD via an SVD in the Fourier domain. Let $\hat{X}$ be the DFT along the third dimension of tensor X represented by $\hat{X}$=fft(X, [ ], 3). Given SVD in the Fourier domain

[U(:, :, k), S(:, :, k), V(:, :, k)]=SVD($\hat{X}$(:, :, k)), for k=1, ..., $n_3$, we can determine t-SVD in Eqn. (4) by $$U = \text{ifft}(U, [ ], 3), S = \text{ifft}(S, [ ], 3), V = \text{ifft}(V, [ ], 3), \quad (5)$$

where fft and ifft represent the fast Fourier transform and its inverse, respectively.

Note that many properties of matrix SVD are retained in t-SVD, among which an important one is the optimality of the truncated t-SVD for provably optimal dimension reduction.

Online Tensor Robust PCA

Now we consider the problem of recovering a tensor of low dimensional submodule from sparsely corrupted data. Suppose we have a third-order tensor Z, which can be decomposed as, $$Z = X + E, \quad (6)$$

where X is a tensor with low tensor tubal rank and E is a sparse tensor. The problem of recovering X and E separately, termed tensor RPCA, can be formulated as an optimization problem $$\min_{X, E} \|X\|_{TNN} + \lambda \|E\|_1, \text{ s.t. } Z = X + E, \quad (7)$$

where λ is a predetermined weighting factor, $\|X\|_{TNN}$ denotes the tensor nuclear norm defined as the summation of all the singular values of tensor X in the t-SVD sense:

$$\|E\|_1 = \Sigma_{i,j,k} |E(i,j,k)|; \text{ and } \lambda > 0. \quad (5)$$

Note that Eqn. (7) is equivalent to the following problem, $$\min_{X,E} \frac{1}{2}\|Z - X - E\|_F^2 + \lambda_1 \|X\|_{TNN} + \lambda_2 \|E\|_1, \quad (8)$$

with $\lambda_1, \lambda_2 > 0$.

Now, we describe an implementation of tensor PCA that operates online. Suppose the 2-D data samples $Z(:,i,:)$, $i=1, 2, \ldots, T$ representing the set of images 102 are acquired 210 sequentially. Our goal is to estimate the spanning basis (principal components) of X online as the images are received at the processor 100, and separate the sparse tensor concurrently. In order to proceed, we rely on the following lemma.

For a third-order tensor $X \in \mathbb{R}^{n_1 \times n \times n_3}$, suppose its rank is upper bounded by r, then we have $$\|X\|_{TNN} = \inf_{\substack{L \in \mathbb{R}^{n_1 \times r \times n_3} \\ R \in \mathbb{R}^{n_2 \times r \times n_3}}} \left\{ \frac{n_3}{2}(\|L\|_F^2 + \|R\|_F^2) : X = L * R^T \right\}. \quad (9)$$

Using the above lemma, we re-write Eqn. (8) as $$\min_{L,R,E} \frac{1}{2}\|Z - L * R^T - E\|_F^2 + \quad (10)$$

$$\frac{n_3 \lambda_1}{2}(\|L\|_F^2 + \|R\|_F^2) + \lambda_2 \|E\|_1 \text{ s.t. } X = L * R^T,$$

where $L \in \mathbb{R}^{n_1 \times r \times n_3}, R \in \mathbb{R}^{n_2 \times r \times n_3}$.

For sequentially acquired data $\{\vec{Z}_1, \vec{Z}_2, \ldots, \vec{Z}_T\} \in \mathbb{R}^{n_1 \times 1 \times n_3}$, we define a loss function for each sample based on Eqn. (10) as $$\ell(\vec{Z}_i, L) = \min_{\vec{R}, \vec{E}} \frac{1}{2}\|\vec{Z}_i - L * \vec{R}^T - \vec{E}\|_F^2 + \frac{n_3 \lambda}{2}\|\vec{R}\|_F^2 + \lambda_2 \|\vec{E}\|_1. \quad (11)$$

Figure 7:
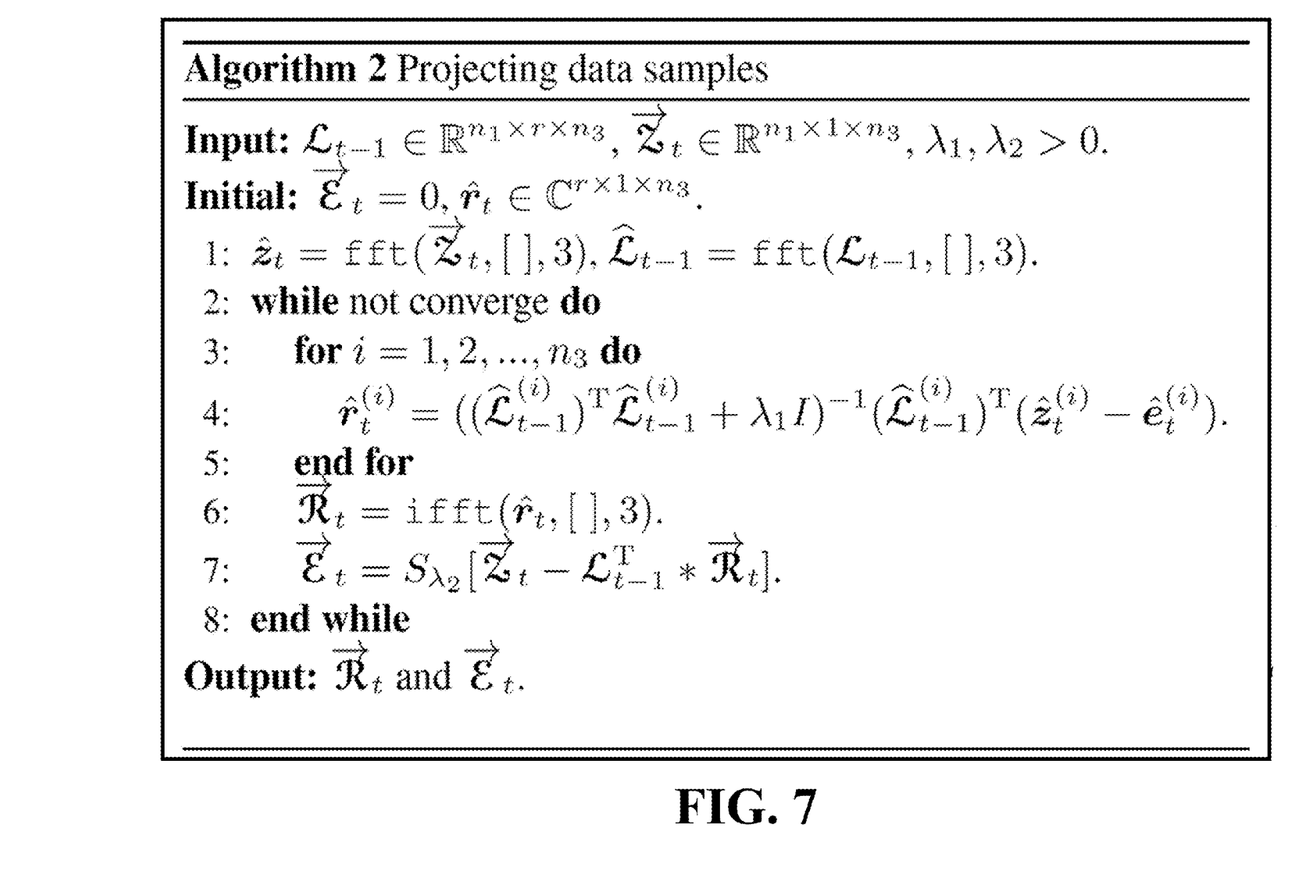
FIG. 7 is a block diagram of pseudocode for projecting data samples according to embodiments of the invention.
Figure 8:
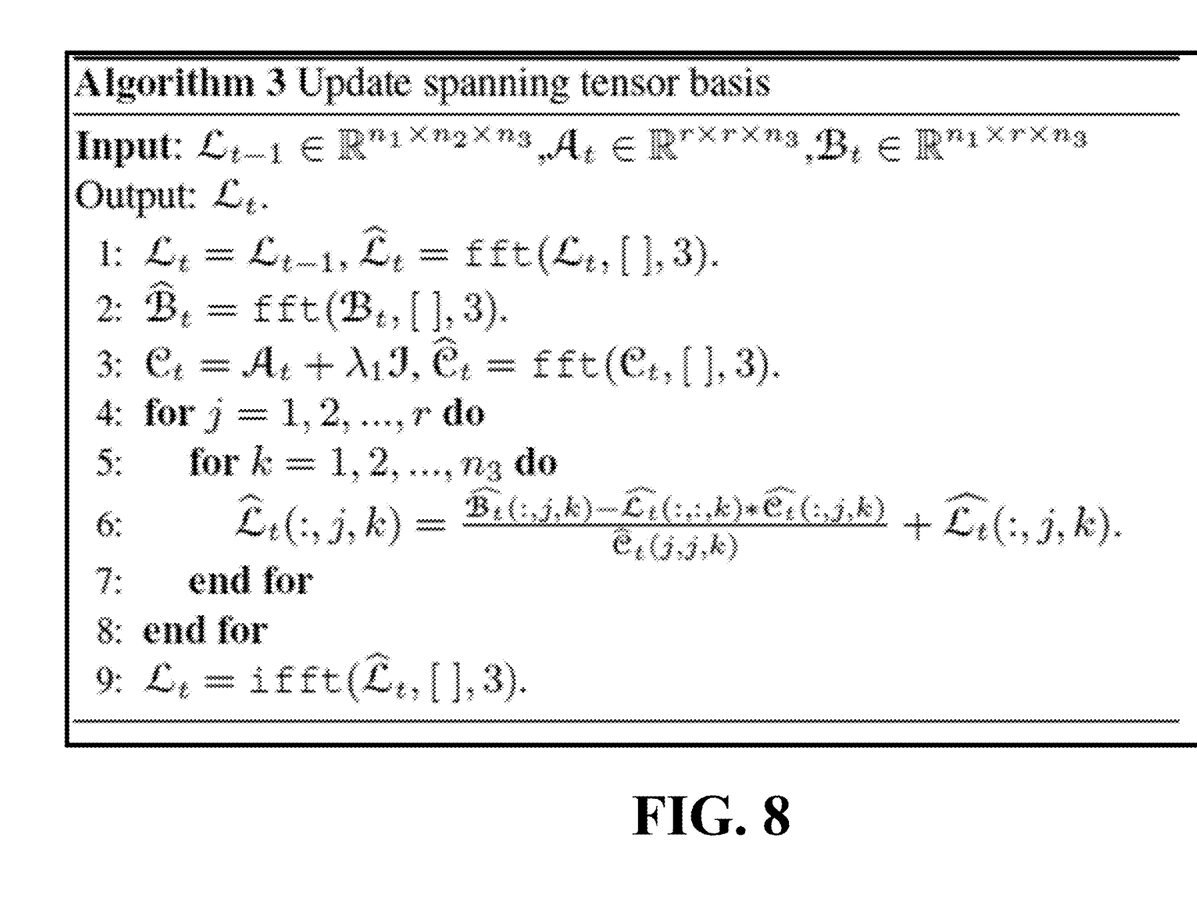
FIG. 8 is a block diagram of pseudocode for updating the spanning basis according to embodiments of the invention.
Figure 9:
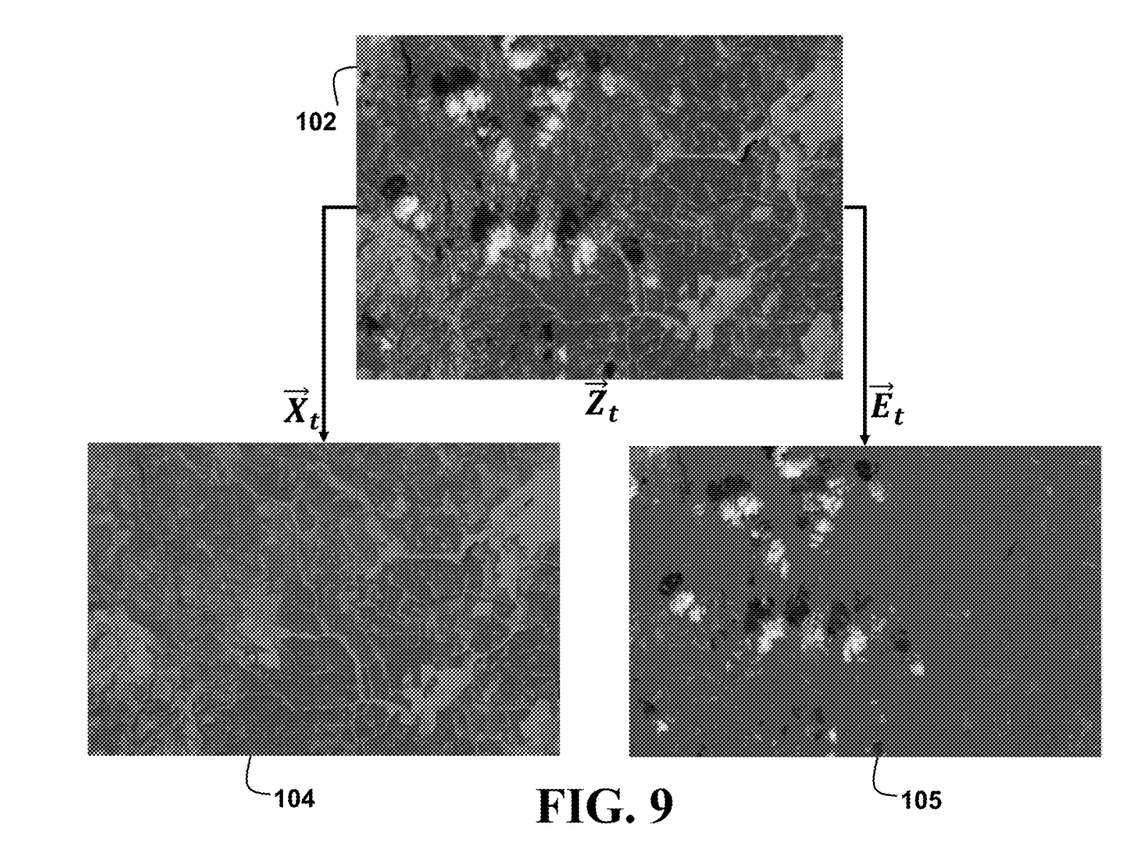
FIG. 9 is a schematic of an input image separated into an enhanced image and a sparse cloud only images according to embodiments of the invention.

FIG. 6 shows the pseudocode of Algorithm 1 for solving the online tensor RPCA problem described above. FIG. 7 shows the pseudocode of Algorithm 2 for projecting 220 data samples, i.e., images tensors $Z_t$ used in Algorithm 1. FIG. 8 shows the pseudocode of Algorithm 3 for updating 225 the spanning tensor basis used in Algorithm 1. All variables used by these algorithms are defined herein.

Input to algorithm 1 includes the acquired data $A_T$ and the number of time rounds T. For simplicity, we use $\hat{A}$ to denote the fft(A, [ ], 3), and $A \in \mathbb{R}^{n_1 n_3 \times n_2 n_3}$ to denote the block diagonal matrix of $\hat{A}$ defined by $$A = \text{blkdiag}(\hat{A}) = \text{diag}(\hat{A}^{(1)}, \hat{A}^{(2)}, \ldots, \hat{A}^{(n_3)}). \quad (12)$$

One key idea of our online tensor RPCA algorithm is that at new image $Z_t$, we minimize a loss function over $Z_t$ given the previous estimation of the spanning tensor basis $L_{t-1}$, to produce the optimal $R_t$ and $E_t$. Then, we alternately use the latest estimated components to update 225 the spanning basis $L_t$ by minimizing a cumulative loss.

Specifically, $R_t$ and $E_t$ are optimized in step 3 with details given in algorithm 3. In the data projection 220 step in Algorithm 2, $S_\lambda[\cdot]$ is a soft-thresholding operator defined by $$S_\lambda[x] = \begin{cases} x - \lambda, & \text{if } x > +\lambda \\ x + \lambda, & \text{if } x < -\lambda \\ 0 & \text{otherwise} \end{cases}. \quad (13)$$

To update 225 the spanning basis $L_t$, we have $$\begin{aligned}
\mathcal{L}_t &= \operatorname*{argmin}_{\mathcal{L}} \sum_{i=1}^{t} \left( \frac{1}{2}\|\vec{\mathcal{Z}}_i - \mathcal{L} * \vec{\mathcal{R}}_i^T - \vec{\mathcal{E}}_i\|_F^2 + \frac{n_3 \lambda_1}{2}\|\vec{\mathcal{R}}_i\|_F^2 + \right. \\
&\quad \left. \lambda_2 \|\vec{\mathcal{E}}_i\|_1 \right) + \frac{n_3 \lambda_1}{2}\|\mathcal{L}\|_F^2 \\
&= \operatorname*{argmin}_{\mathcal{L}} \frac{1}{2}\|\mathcal{Z}_t - \mathcal{E}_t - \mathcal{L} * \mathcal{R}_t^T\|_F^2 + \frac{n_3 \lambda_1}{2}\|\mathcal{L}\|_F^2 \\
&= \operatorname*{argmin}_{\mathcal{L}} \frac{1}{2}\|\mathcal{Z}_t - \mathcal{E}_t - \mathcal{L}\mathcal{R}_t^T\|_F^2 + \frac{n_3 \lambda_1}{2}\|\mathcal{L}\|_F^2 \\
&= \operatorname*{argmin}_{\mathcal{L}} \frac{1}{2} tr\left((\mathcal{Z}_t - \mathcal{E}_t - \mathcal{L}\mathcal{R}_t^T)^T(\mathcal{Z}_t - \mathcal{E}_t - \mathcal{L}\mathcal{R}_t^T)\right) + \\
&\quad \frac{n_3 \lambda_1}{2} tr(\mathcal{L}^T \mathcal{L}) \\
&= \operatorname*{argmin}_{\mathcal{L}} \frac{1}{2} tr(\mathcal{L}(\mathcal{R}_t^T \mathcal{R}_t + n_3 \lambda_1 I)\mathcal{L}^T) - tr(\mathcal{L}^T(\mathcal{Z}_t - \mathcal{E}_t)\mathcal{R}_t),
\end{aligned} \quad (14)$$

where tr is the trace operator.

Let $A_t = A_{t-1} + \vec{R}_t * \vec{R}^T$ and $B_t = B_{t-1} + (\vec{Z} - \vec{E}_t) * \vec{R}_t$, where $\vec{R} \in \mathbb{R}^{r \times 1 \times n_3}, \vec{E}_t \in \mathbb{R}^{n_1 \times 1 \times n_3}$, as indicated in step 4 of algorithm 1. We update $A_t$, $B_t$ each time new data comes and save the updated $A_t$, $B_t$ such that we can update the spanning basis $L_t$ in the Fourier domain with block-coordinate descent, as indicated in step 5 of Algorithm 1 with details in Algorithm 3. Note that our algorithm needs a prior information about estimated upper bound of the rank of the overall data samples.

For the batch tensor robust PCA, all the data samples up to image T, i.e., the total number of entries in $\{Z_i\}_{i=1}^T$, are required. Therefore, the memory requirement for the batch tensor robust PCA is $n_1 n_3 T$.

For online tensor robust PCA, we need to save $L_{t-1} \in \mathbb{R}^{n_1 \times r \times n_3}$, $R_T \in \mathbb{R}^{T \times r \times n_3}$ ($A_T$ can be determined through $R_T$), $B_T \in \mathbb{R}^{n_1 \times r \times n_3}$. Therefore, the total storage requirement is $n_3 rT + n_1 n_3 r$, which is much smaller than that of the batch tensor robust PCA when r<<T. In other words, the memory requirement for processing the data samples online is about r/T of that of processing the data using batch mode tensor robust PCA, where n is a rank of the low rank tubal tensor, and T is a number of input images.

Other Image Processing Applications

The invention can also be used for other applications. In the case of background subtraction, also known as foreground detection, a foreground of an image is extracted for further processing such as object detection and recognition, e.g., pedestrians, vehicles, etc. Background subtraction can be used for detecting moving objects in a sequence of images (video). Background subtraction provides important cues for numerous applications in computer vision, for example surveillance tracking or human poses estimation.

In the processing method according to embodiments of the invention, the output background images would be constructed from the low rank tubal tensor X, and the foreground images are constructed from the sparse tensors E.

In the case of noise reduction, the reduced noise images would be derived from the low rank tubal tensor X The sparse tensor E representing the noise can essentially be discarded.

Although the invention has been described by way of examples of preferred embodiments, it is understood that various other adaptations and modifications can be made within the spirit and scope of the invention. Therefore, it is the object of the appended claims to cover all such variations and modifications as come within the true spirit and scope of the invention.

We claim:

1. A method for online processing sequence of images of a scene, wherein the sequence of images represents an image tensor, comprising:
    acquiring the sequence of images of the scene from at least one sensor from an input interface device, such that the acquired sequences of images of the scene include occlusions caused by structures in the scene, wherein the structures include buildings, clouds, or both, between the scene and the at least one sensor;
    initializing a low-tubal rank tensor and a sparse tensor using a first image of the sequence of images, and storing the low-tubal rank tensor and the sparse tensor in a memory, wherein the low-tubal rank tensor is a tensor product of a low-rank spanning tensor basis and corresponding tensor coefficients;
    iteratively, updating a previously stored low-tubal rank tensor and a previously stored sparse tensor from a previous iteration stored in memory, by using each sequential image of the sequentially acquired images, to obtain an updated low-tubal rank tensor and an updated sparse tensor, wherein the updated low-tubal rank tensor is a tensor product of an updated low-rank spanning tensor basis and updated corresponding tensor coefficients; and
    outputting one of the updated low-tubal rank tensor, the updated sparse tensor, or both, upon completion of the iteration of all the sequentially acquired images, and wherein the steps are performed in a processor in communication with the memory.

2. The method of claim 1, wherein the low-tubal rank tensor represents a background of the scene shared across all the sequentially acquired images, and the sparse tensor represents objects in the scene from one or more occlusions in an image of the sequentially acquired images.

3. The method of claim 1, wherein the updated low-tubal rank tensor represents a set of output images and the updated sparse tensor represents a set of sparse images.

4. The method of claim 1, wherein the first image is a set of images within the sequence of images used for initializing the low-tubal rank tensor and the sparse tensor.

5. The method of claim 1, wherein the images are multi-temporal images or multi-angle view images.

6. The method of claim 1, wherein the image tensor is decomposed into the low-tubal rank tensor and the sparse tensor using tensor robust principle component analysis (PCA).

7. The method of claim 1, wherein the low-tubal rank tensor represents a background in the scene, and the sparse tensor represents a foreground in the scene.

8. The method of claim 1, wherein the low-tubal rank tensor represents reduced noise images, and the sparse tensor represents noise.

9. The method of claim 1, wherein the at least one sensor is moving when the sequences of images of the scene are acquired.

10. The method of claim 9, wherein the at least one sensor is arranged in a satellite or an airplane.

11. The method of claim 1, wherein the at least one sensor is two or more sensors, such that the sequences of images of the scene acquired by the two or more sensors include occlusions caused by clouds between the two or more sensors and scene, and structures in the scene, and wherein the set of output images represent the scene without the occlusions, and the output set of sparse images represent only the occlusions.

12. A system for processing images, wherein each image is represented as an image tensor, comprising:
    an input interface to receive sequentially a set of input images acquired by at least one sensor, such that the acquired sequentially set of input images of the scene include occlusions caused by structures in the scene, wherein the structures include buildings, clouds, or both, between the scene and the at least one sensor; and
    a processor in communication with a memory, the processor is configured to:
        initialize a low-tubal rank tensor and a sparse tensor using a first image of the sequence of images, and store the low-tubal rank tensor and the sparse tensor in the memory;
        iteratively, update a previously stored low-tubal rank tensor and a previously stored sparse tensor from a previous iteration stored in memory, by using each sequential image of the sequentially acquired images, to obtain an updated low-tubal rank tensor and an updated sparse tensor; and
        output one of the updated low-tubal rank tensor, the updated sparse tensor, or both, upon completion of the iteration of all the sequentially acquired images.

13. The system of claim 12, wherein the low-tubal rank tensor represents a background of the scene shared across all the sequentially acquired images, and the sparse tensor represents objects in the scene from one or more occlusions in an image of the sequentially acquired images.

14. The system of claim 12, wherein the updated low-tubal rank tensor represents a set of output images and the updated sparse tensor represents a set of sparse images.

15. The system of claim 12, wherein the first image is a set of images within the sequence of images used for initializing the low-tubal rank tensor and the sparse tensor.

16. The method of claim 12, wherein the low-tubal rank tensor is a tensor product of a low-rank spanning tensor basis and corresponding tensor coefficients, and, wherein the updated low-tubal rank tensor is a tensor product of an updated low-rank spanning tensor basis and updated corresponding tensor coefficients.

17. The method of claim 12, wherein the image tensor is decomposed into the low-tubal rank tensor and the sparse tensor using tensor robust principle component analysis (PCA).

18. The method of claim 12, wherein the low-tubal rank tensor represents a background in the scene, and the sparse tensor represents a foreground in the scene.

19. The method of claim 12, wherein the low-tubal rank tensor represents reduced noise images, and the sparse tensor represents noise.

20. A method for online processing sequence of images of a scene, wherein the sequence of images represents an image tensor, comprising:

acquiring the sequence of images of the scene from at least two sensors from an input interface device, such that the acquired sequences of images of the scene include occlusions caused by clouds in the scene between the at least two sensors and scene, and structures in the scene;

initializing a low-tubal rank tensor and a sparse tensor using a first image of the acquired sequence of images, and storing the low-tubal rank tensor and the sparse tensor in a memory, wherein the low-tubal rank tensor is a tensor product of a low-rank spanning tensor basis and corresponding tensor coefficients;

iteratively, updating a previously stored low-tubal rank tensor and a previously stored sparse tensor from a previous iteration stored in memory, by using each sequential image of the sequentially acquired images, to obtain an updated low-tubal rank tensor and an updated sparse tensor, wherein the updated low-tubal rank tensor is a tensor product of an updated low-rank spanning tensor basis and updated corresponding tensor coefficients; and outputting one of the updated low-tubal rank tensor, the updated sparse tensor, or both, upon completion of the iteration of all the sequentially acquired images, and wherein the steps are performed in a processor in communication with the memory.

* * * * *